(12) United States Patent
Yu et al.

(10) Patent No.: US 9,733,438 B2
(45) Date of Patent: Aug. 15, 2017

(54) OPTICAL CONNECTOR FOR DATA TRANSCEIVER MODULES AND LENS BLOCK FOR OPTICAL CONNECTORS

(71) Applicant: SAE Magnetics (H.K.) Ltd., Hong Kong (HK)

(72) Inventors: Xiaoming Yu, Hong Kong (HK); Vincent Wai Hung, Hong Kong (HK); Margarito P. Banal, Jr., Hong Kong (HK); Yuk Nga Chen, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 14/932,997

(22) Filed: Nov. 5, 2015

(65) Prior Publication Data

US 2017/0131488 A1    May 11, 2017

(51) Int. Cl.
*G02B 6/42* (2006.01)
*G02B 6/38* (2006.01)
*G02B 6/32* (2006.01)

(52) U.S. Cl.
CPC ............. *G02B 6/4206* (2013.01); *G02B 6/32* (2013.01); *G02B 6/3885* (2013.01); *G02B 6/4214* (2013.01); *G02B 6/4246* (2013.01); *G02B 6/4249* (2013.01); *G02B 6/4281* (2013.01); *G02B 6/4286* (2013.01); *G02B 6/4292* (2013.01)

(58) Field of Classification Search
USPC ..................................... 385/89–92
See application file for complete search history.

(56) References Cited

U.S. PATENT DOCUMENTS

| | | | |
|---|---|---|---|
| 2003/0138219 A1* | 7/2003 | O'Toole | G02B 6/4214 385/92 |
| 2008/0062980 A1* | 3/2008 | Sunaga | G02B 6/4246 370/389 |
| 2009/0202252 A1* | 8/2009 | Sunaga | G02B 6/29361 398/139 |
| 2014/0079403 A1* | 3/2014 | Daghighian | H05K 1/0283 398/115 |

\* cited by examiner

*Primary Examiner* — Eric Wong

(57) ABSTRACT

An optical connector includes a lens block mounted in a MPO housing and optically coupled between an optical light guide and an external coupling light guide. A first lens formed on a first surface of the lens block to totally reflect and collimate light emitting from the optical light guide to a second surface. The second surface is coated with a partial transmission coating on a transmitter side and a total reflective coating on a receiver side. A second lens formed on a third or fourth surface on the lens block for focusing light from the second surface onto the external coupling light guide.

20 Claims, 9 Drawing Sheets

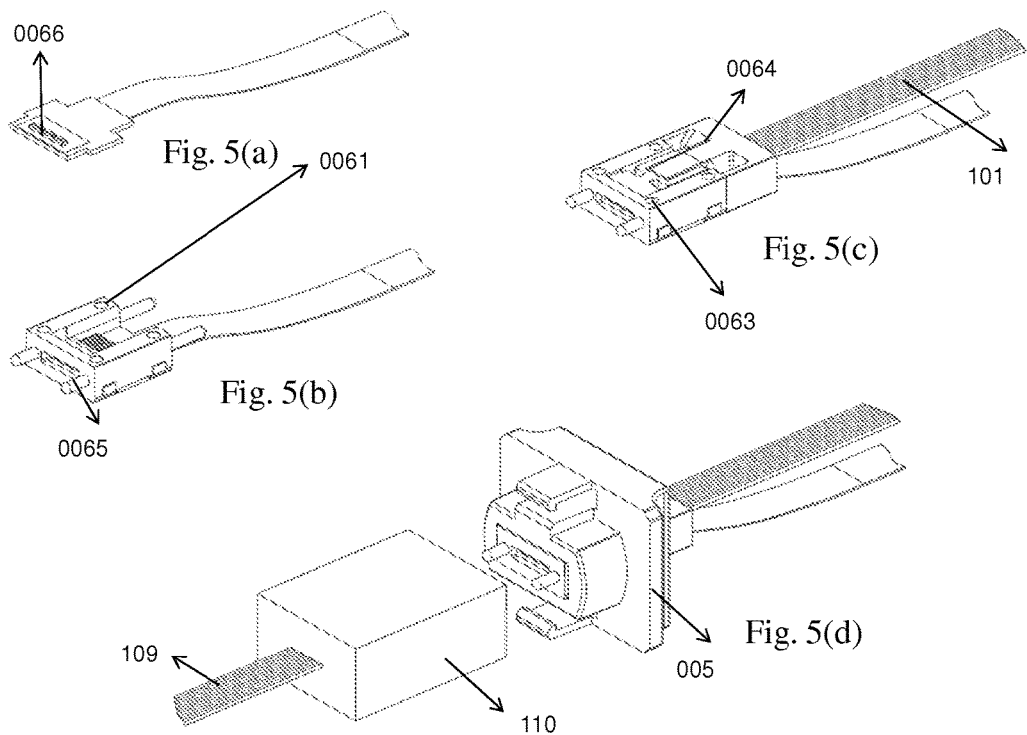
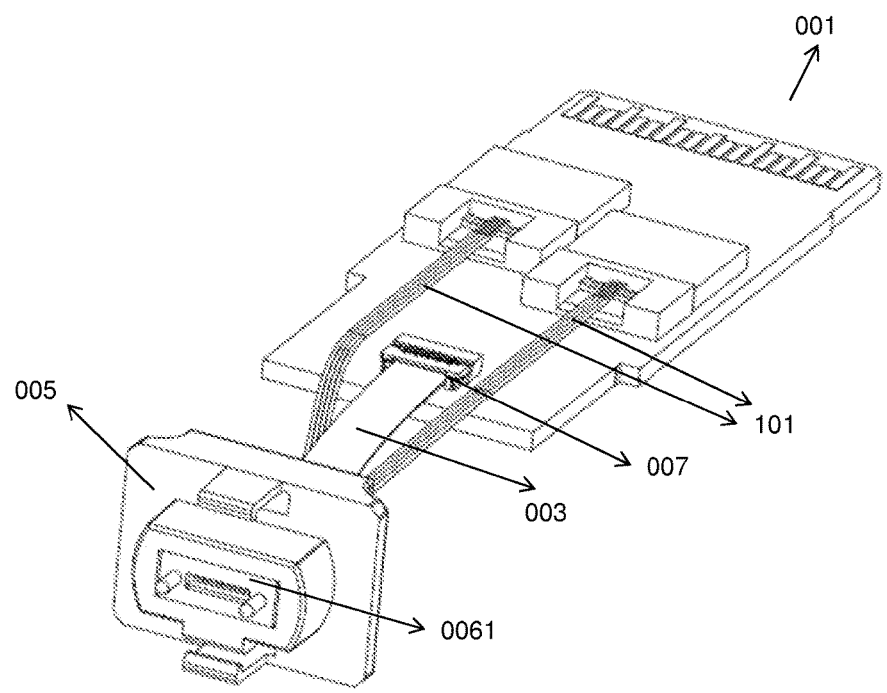
Fig. 6(a)

OPTICAL CONNECTOR FOR DATA TRANSCEIVER MODULES AND LENS BLOCK FOR OPTICAL CONNECTORS

FIELD OF THE TECHNOLOGY

The present application relates to an optical connector for a data transceiver module and a lens block for the optical connector.

BACKGROUND

Vertical cavity surface emitting laser (VCSEL) power monitoring is necessary for controlling VCSEL power at particular "eye safety" level. People always package it at the same level of VCSEL and on a main printed circuit board (PCB). Partially reflected light from OE lens is detected by monitoring photo diode(s) thereby giving a real time monitoring signal scaling to the absolute level of VCSEL emitting light. The monitoring signal gives indication of VCSEL power change corresponding to the change of moisture, heat, and other lifetime impact conditions.

However, traditional method always has constrained the flexibility of monitoring position and relative relationship of VCSEL and monitoring diodes. Thus, there is a need to provide a more efficient VCSEL power monitoring structure, and use the structure to realize the same function of standard optical connector at the same time.

Standard optical connector always use direct contacting connection method, to connect two sides fiber end to end, for transmitting light from one side directly to the other. Since this direct contact method has the possibility of getting two fiber surfaces touching each other during connection process, the fiber surfaces are facing potential damage of being scratched. This problem is being solved in this connector invention at the same time.

The above description of the background is provided to aid in understanding the optical connector, but is not admitted to describe or constitute pertinent prior art to the optical connector, or consider any cited documents as material to the patentability of the claims of the present application.

SUMMARY

According to one aspect, there is provided an optical connector for data transceiver modules which may include an optical light guide having one end held in an internal multiple-fiber push-on/pull-off (MPO) housing, the optical light guide including a plurality of channels only for use in transmission of optical signals; an external coupling light guide having one end held in an external MPO housing configured to couple with the internal MPO housing; a lens block mounted in the internal MPO housing and optically coupled between the ends of the optical light guide and the external coupling light guide; a fiber cover mounted on top of the lens block, the end of the optical light guide being held between the fiber cover and the lens block, an opposite end of the optical light guide being connected with an optical engine assembly provided on a data transceiver module; a monitor photo diode array mounted on an electrical substrate disposed underneath the lens block; and a flexible printed circuit board having one end connected with the electrical substrate and an opposite end connected with a printed circuit board connector provided on the data transceiver module.

In one embodiment, the lens block may include a first lens formed on a first surface and configured to collimate light from the optical light guide to a second surface, the entire second surface being coated with a partial transmission coating whereby a first portion of collimated light from the first lens is reflected to a second lens, and a second portion of collimated light from the first lens is tapped out of the lens block through the partial transmission coating towards the monitor photo diode array, and the second lens being configured to focus light from the second surface to the external coupling light guide. The optical light guide can be a 12-channel optical light guide.

According to another aspect, there is provided an optical connector for data transceiver modules which may include a signal-transmitting optical light guide and a signal-receiving optical light guide, each optical light guide having one end held in an internal multiple-fiber push-on/pull-off (MPO) housing; an external coupling light guide having one end held in an external MPO housing configured to couple with the internal MPO housing; a lens block mounted in the internal MPO housing and optically coupled between the ends of the signal-transmitting and signal-receiving optical light guides and the end of the external coupling light guide; a fiber cover mounted on top of the lens block, the end of the signal-transmitting optical light guide being held between the fiber cover and the lens block at a transmitting side thereof and an opposite end of the signal-transmitting optical light guide being connected with a first optical engine assembly provided on a data transceiver module, the end of the signal-receiving optical light guide being held between the fiber cover and the lens block at a receiving side thereof and an opposite end of the signal-receiving optical light guide being connected with a second optical engine assembly provided on the data transceiver module; a monitor photo diode array mounted on an electrical substrate disposed underneath the lens block; and a flexible printed circuit board having one end connected with the electrical provided on the data transceiver module. The signal-transmitting optical light guide may include a first plurality of channels only for transmitting optical signals, and the signal-receiving optical light guide comprises a second plurality of channels only for receiving optical signals.

In one embodiment, the lens block may include a first lens formed on a first surface and configured to collimate light from the signal-transmitting optical light guide to a second surface at a transmitting side of the lens block coated with a partial transmission coating, whereby a first portion of collimated light from the first lens is reflected to a second lens, and a second portion of collimated light from the first lens is tapped out of the lens block through the partial transmission coating towards the monitor photo diode array, and the second lens being configured to focus light from the second surface to the external coupling light guide. The second surface at a receiving side of the lens block can be coated with a total reflective coating, whereby when light emitting from the external coupling light guide is collimated by the second lens, collimated light from the second lens is totally reflected by the total reflective coating towards the first lens and then focused onto the signal-receiving optical light guide.

In one embodiment, the signal-transmitting optical light guide can be a 6-channel optical light guide, and the signal-receiving optical light guide can be a 6-channel optical light guide.

According to yet another aspect, there is provided a lens block for an optical connector which may include a first region configured to collimate light from a first optical light guide to a second region, the second region being coated with a partial transmission coating whereby a first portion of collimated light from the first region is reflected to a third region, and a second portion of collimated light from the first lens is tapped out of the lens block through the partial transmission coating, and the third region being configured to focus light from the second region to a second optical light guide.

In one embodiment, the first region may include an end surface facing the first optical light guide and a first lens formed on a first surface disposed at an angle with respect to the end surface, and the second region is provided with a second surface on which the partial transmission coating is coated.

In one embodiment, the third region may include a second lens formed on a third surface facing the second optical light guide and a fourth surface disposed at an angle with respect to the third surface.

In one embodiment, the third region may include a third surface facing the second optical light guide and a second lens formed on a fourth surface disposed at an angle with respect to the third surface.

In one embodiment, the third region may include a second lens facing the second optical light guide, wherein the first lens is disposed along a first longitudinal axis of the first optical light guide, and the second surface is disposed along and at an angle with respect to a second longitudinal axis of the second optical light guide which is spaced apart from the first longitudinal axis of the first optical light guide, whereby optical light path in the lens block between the first and second optical light guides is Z-shaped.

In one embodiment, the entire lens block is only used for transmission and the second surface is entirely coated with the partial transmission coating, whereby when light emitting from the first optical light guide and entering the lens block through the end surface is totally reflected and collimated by the first lens, the first portion of collimated light from the first lens is reflected by the partial transmission coating towards the fourth surface where it is further reflected to the second lens and then focused onto the second optical light guide, and the second portion of collimated light from the first lens is tapped out of the lens block through the partial transmission coating.

In one embodiment, the lens block may include a transmitting side and a receiving side, and the second surface at the transmitting side is coated with the partial transmission coating, whereby when light emitting from the first optical light guide and entering the transmitting side of the lens block through the end surface is totally reflected and collimated by the first lens, the first portion of collimated light from the first lens is reflected by the partial transmission coating towards the fourth surface where it is further reflected to the second lens and then focused onto the second optical light guide, and the second portion of collimated light from the first lens is tapped out of the lens block through the partial transmission coating.

In one embodiment, the second surface at the receiving side of the lens block may be coated with a total reflective coating, whereby when light emitting from the second optical light guide is collimated by the second lens, the collimated light from the second lens is totally reflected by the fourth surface and further totally reflected by the total reflective coating towards the first lens and then focused onto a third optical light guide.

In one embodiment, the lens block may include a transmitting side and a receiving side, and the second surface at the transmitting side of the lens block is coated with the partial transmission coating, whereby when light emitting from the first optical light guide and entering the transmitting side of the lens block through the end surface is totally reflected and collimated by the first lens, the first portion of collimated light from the first lens is reflected by the partial transmission coating towards the second lens where it is focused onto the second optical light guide through the third surface, and the second portion of collimated light from the first lens is tapped out of the lens block through the partial transmission coating.

In one embodiment, the second surface at the receiving side of the lens block may be coated with a total reflective coating, whereby when light emitting from the second optical light guide and entering the lens block through the third surface is collimated by the second lens, the collimated light from the second lens is totally reflected by the total reflective coating towards the first lens and then focused onto a third optical light guide.

In one embodiment, the lens block may include a transmitting side and a receiving side, and the second surface at the transmitting side of the lens block is coated with the partial transmission coating, whereby when light emitting from the first optical light guide and entering the lens block through the end surface is totally reflected and collimated by the first lens, the first portion of collimated light from the first lens is reflected by the partial transmission coating towards the second lens and then focused onto the second optical light guide, and the second portion of collimated light from the first lens is tapped out of the lens block through the partial transmission coating.

In one embodiment, the second surface at the receiving side of the lens block may be coated with a total reflective coating, whereby when light emitting from the second optical light guide is collimated by the second lens, the collimated light from the second lens is totally reflected by the total reflective coating towards the first lens and then focused onto a third optical light guide.

In one embodiment, the first surface can be an angled surface disposed along and at an angle with respect to a first longitudinal axis of the first optical light guide.

In one embodiment, the third surface can be an angled surface disposed along and at an angle with respect to a second longitudinal axis of the second optical light guide.

Although the optical connector is shown and described with respect to certain embodiments, it is obvious that equivalents and modifications will occur to others skilled in the art upon the reading and understanding of the specification. The optical connector in the present application includes all such equivalents and modifications, and is limited only by the scope of the claims.

BRIEF DESCRIPTION OF THE DRAWINGS

Specific embodiments of the optical connector will now be described by way of example with reference to the accompanying drawings wherein:

FIGS. 5(a)-5(d) show an assembly process of the optical connector according to an embodiment of the present application.

FIG. 6(a) is a front perspective view of an optical connector according to another embodiment of the present application.

DETAILED DESCRIPTION

Figure 1:
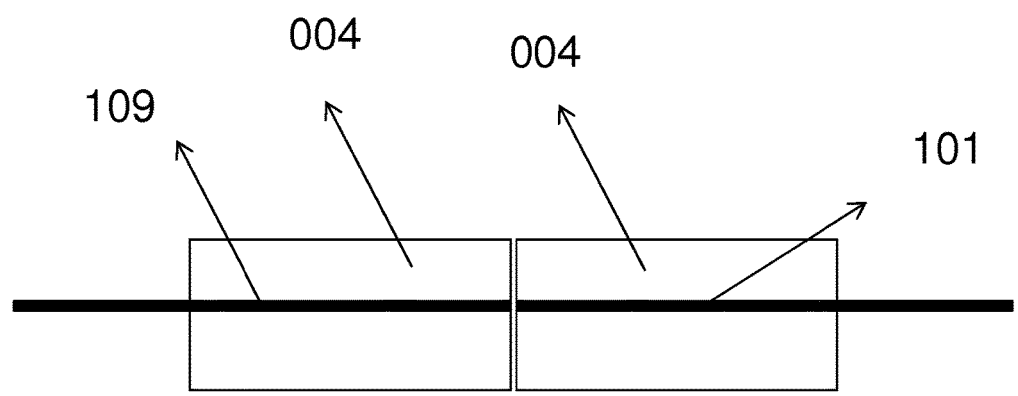
FIG. 1 is an illustrative diagram showing an optical connector of the prior art.

Reference will now be made in detail to a preferred embodiment of the optical connector, examples of which are also provided in the following description. Exemplary embodiments of the optical connector are described in detail, although it will be apparent to those skilled in the relevant art that some features that are not particularly important to an understanding of the optical connector may not be shown for the sake of clarity.

Furthermore, it should be understood that the optical connector is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure and appended claims.

In addition, improvements and modifications which may become apparent to persons of ordinary skill in the art after reading this disclosure, the drawings, and the appended claims are deemed within the spirit and scope of the protection.

For illustration purposes, the terms such as "upper", "lower", "vertical", "horizontal", "top" or "bottom" appeared hereinafter relate to the invention as it is oriented in the drawings. It is understood that the invention may assume various positions, except where expressly specified to the contrary. Furthermore, it is understood that the specific devices shown in the drawings, and described in the following description, are simply exemplary embodiments of the invention. Hence, specific dimensions and other physical characteristics related to the embodiments disclosed hereinafter are not to be considered as limiting.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical, electrical or optical communication with another element.

FIG. 1 shows an optical connector of the prior art. Ordinary optical connection is achieved by combining two identical multiple-fiber push-on/pull-off (MPO) connectors. They include an optical light guide 101, external coupling light guide 109 and housings 004. The two connectors are pressed tightly to each other, face to face. Hence, the optical light guide 101 and the external coupling light guide 109 are pressed to each other end to end. Then light is guided from the optical light guide 101 to the external coupling light guide 109, or from the external coupling light guide 109 to the optical light guide 101.

Figure 2:
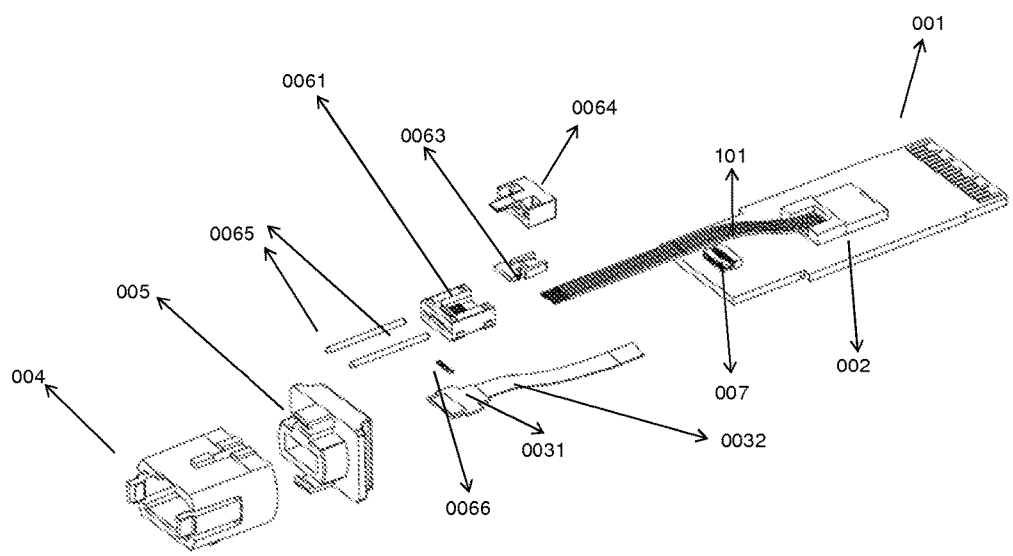
FIG. 2 is an exploded view of an optical connector according to an embodiment of the present application.

FIG. 2 is an exploded view of an optical connector according to an embodiment of the present application. This monitor photo diode assembled with multiple-fiber push-on/pull-off (MPO) jumper may include a data transceiver module 001 provided with an optical engine assembly 002 and a flexible printed circuit board (PCB) connector 003. The optical engine assembly 002 may include lens, vertical cavity surface emitting laser (VCSEL), photo diodes, and their drivers.

One end of an optical light guide 101 may be optically coupled with the optical engine assembly 002, and the other end of the optical light guide 101 may be optically coupled with a monitor lens block 0061. The other end of the optical light guide 101 can be supported on a fiber v-groove 102 or a blind hole. The monitor lens block 0061 can be mounted within an internal MPO housing 005. The internal MPO housing 005 may be coupled with an external MPO housing 004, which may be provided with an external coupling light guide 109. A plurality of alignment pins 0065 may be mounted through the lens block 0061 to facilitate alignment of the external and internal MPO housings 004, 005.

A fiber cover 0063 may be mounted on top of the lens block 0061. An end of the optical light guide 101 may be disposed between the fiber cover 0063 and a portion of the lens block 0061. A fiber cover lock 0064 may be used to lock the fiber cover 0063 in a fixed position. An opposite end of the optical light guide 101 may be connected with the optical engine assembly 002 provided on the data transceiver module 001.

A monitor photo diode array 0066 may be mounted on an electrical substrate 0031 disposed underneath the lens block 0061. The electrical substrate 0031 may be provided at one end of a flexible printed circuit board (PCB) 0032. An opposite end of the flexible PCB 0032 may be connected with a PCB connector 007 provided on the data transceiver module 001.

The plastic lens block can be assembled with transceiver side fibers with V-grooves or blind holes or other features. The fibers can be assembled with fiber cover, and fixed with epoxy added onto the V-groove area. Between fiber end and plastic lens, index matching epoxy can be applied for better compatible of fiber and plastic materials. Then the cover lock may be added onto the fiber cover, tightly pressing the fiber cover. Also, epoxy may be added into the gap positions between the two layers and cured.

The array of monitor photo diodes 0066 may be bonded onto the flexible PCB 0032 and this PCB 0032 can be assembled under the lens block 0061 with alignment pins 0065 provided through the lens block 0061. Epoxy may be added around the cavity to attach the flexible PCB. The transceiver side fiber can be assembled with optical component and flexible PCB to form a whole optical piece. This optical piece may be inserted into one standard MPO housing and half length of metal alignment pins may be exposed out of the housing for mating the other side standard MPO connector.

The electrical substrate 0031 may be disposed below the monitor lens block 0061. The monitor photo diode array 0066 can be mounted on the electrical substrate 0031 at a position underneath the monitor lens block 0061.

FIGS. 3(a)-3(d) show details of the monitor lens block 0061 according to an embodiment of the present application. The lens block 0061 may include a transmitter side Tx for transmitting signals, and a receiver side Rx for receiving signals (see FIG. 7). The lens block 0061 may be mounted in the internal MPO housing 005 and optically coupled between the optical light guide 101 and the external coupling light guide 109.

A first lens 103 may be formed on a first surface 111 of the lens block 0061 and configured to totally reflect and collimate light emitting from the optical light guide 101 and entering the lens block 0061 through an end surface 112. The first surface 111 may be disposed along and at an angle with respect to a first longitudinal axis X1 of the optical light guide 101.

A second surface 104 may be provided on the lens block 0061 and coated with a partial transmission coating 105 for internally reflecting a first portion of light from the first lens 103 and tapping a second portion of light from the first lens 103 out of the lens block 0061 towards the monitor photo diode array 0066. The second surface 104 may be a flat surface disposed parallel to a second longitudinal axis X2 of the external coupling light guide 109.

Figure 7:
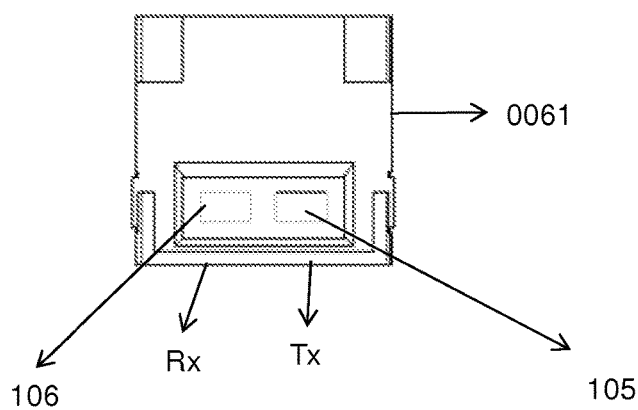
FIG. 7 is a bottom view of the lens block of the optical connector according to another embodiment of the present application.

A second lens 107 may be formed on the lens block 0061 for focusing light from the second surface 104 onto the external coupling light guide 109. The second surface 104 may be further coated with a total reflective coating 106 so that light emitted from the external coupling light guide 109 and collimated by the second lens 107 can be totally reflected by the second surface 104 towards the first lens 103 and focused onto the optical light guide 101. The total reflective coating 106 may be provided on the receiver side Rx of the lens block 0061 and the partial transmission coating may be provided on the transmitter side of the lens block 0061, as illustrated in FIG. 7.

The lens block 0061 may further include a third surface 113 facing the external coupling light guide 109 and a fourth surface 114 disposed at an angle with respect to the third surface 113. The fourth surface 114 may be optically associated with the second surface 104.

Figure 3A:
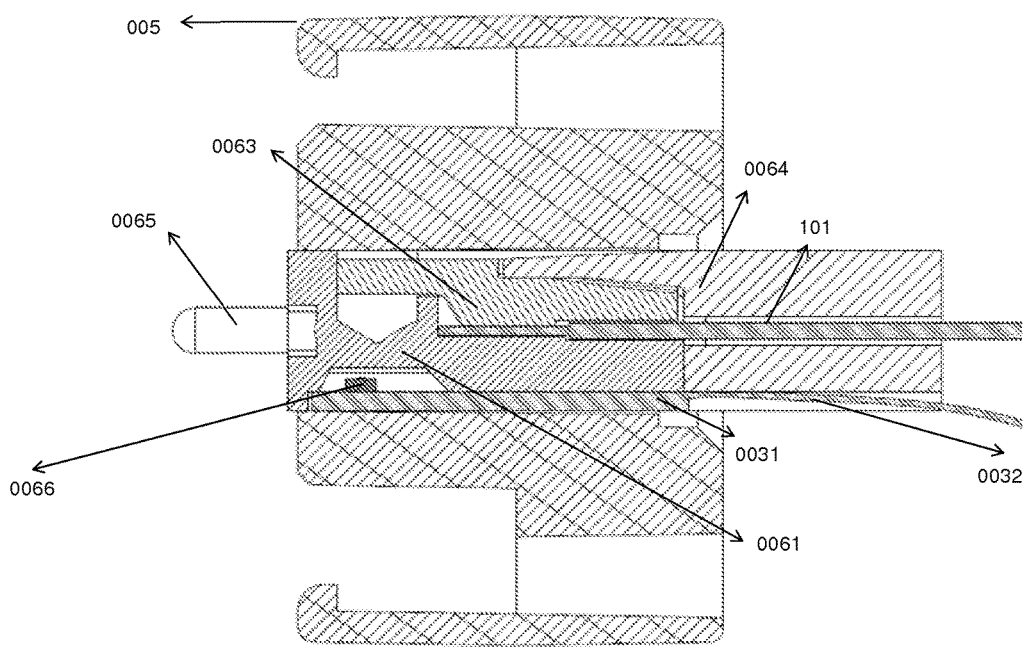
FIG. 3(a) is a cross sectional view of a monitor block of the optical connector according to an embodiment of the present application.
Figure 3B:
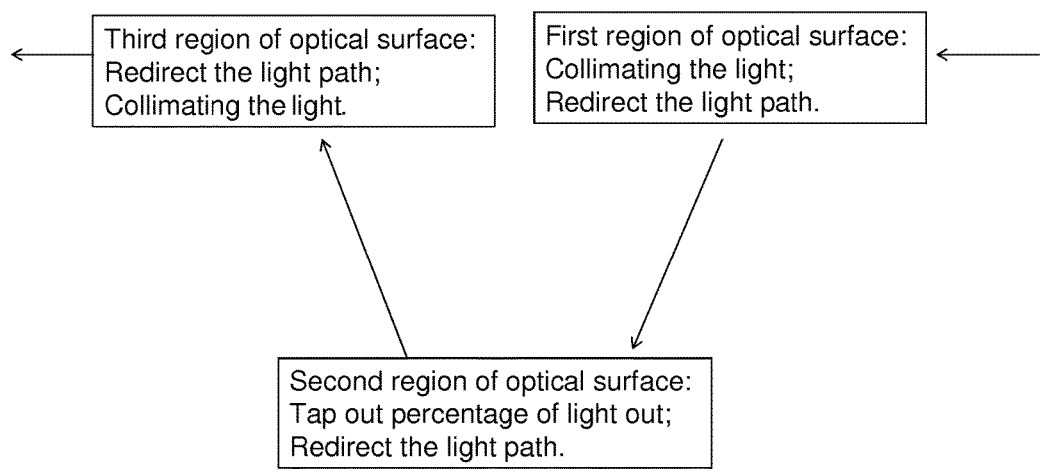
FIG. 3(b) is a block diagram showing the functions of each optical surface of the monitor block of the optical connector according to an embodiment of the present application.
Figure 3C:
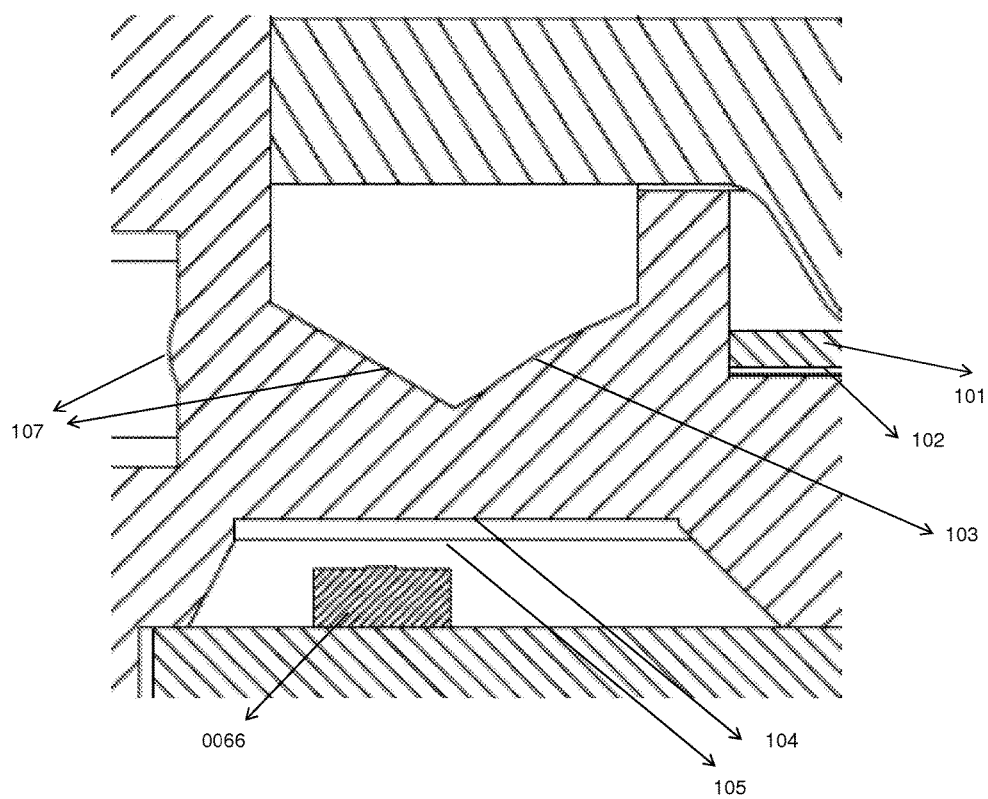
FIG. 3(c) is an enlarged view of the optical surfaces of the monitor block of the optical connector according to an embodiment of the present application.
Figure 3D:
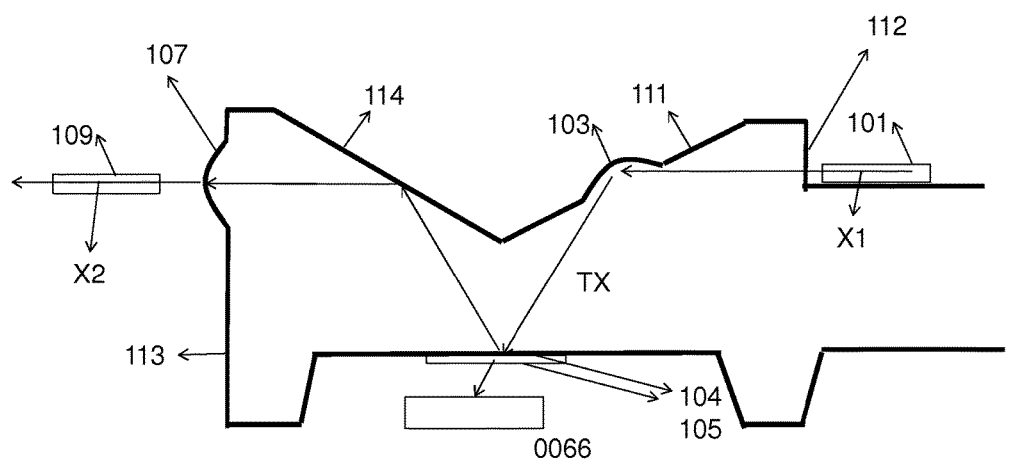
FIG. 3(d) shows an optical path of the monitor block of the optical connector according to an embodiment of the present application.

In one embodiment, as shown in FIG. 3(d), the second lens 107 can be formed on the third surface 113 so that light from the second surface 104 can be totally reflected by the fourth surface 114 towards the second lens 107 and can be focused by the second lens 107 onto the external coupling light guide 109, and light emitting from the external coupling light guide 109 and entering the lens block 0061 can be collimated by the second lens 107 and then totally reflected by the fourth surface 114 towards the second surface 104.

FIG. 3(d) shows the optical path on the transmitter side Tx of the connector. Basically, light emitting out from the data transceiver module 001 passes through the optical light guide 101 (such as fiber, etc.) which may be mounted on V-groove structure 102 of the lens block 0061. Light may be impinged on the first lens 103 of the first surface 111. It is collimated and totally reflected to the second surface 104 of the lens block 0061. On the transmitter side Tx, the second surface 104 may be coated with partial transmission coating 105. Particular percentage of light may be tapped out of the lens block 0061 through the partial transmission coating 105 and may then be monitored by the monitor photo diode array 0066. The other portion of light can be reflected by the partial transmission coating 105 towards the fourth surface 114. Then the light can be totally reflected internally towards the second lens 107 formed on the third surface 113, and finally focused onto the external coupling light guide 109.

Figure 4A:
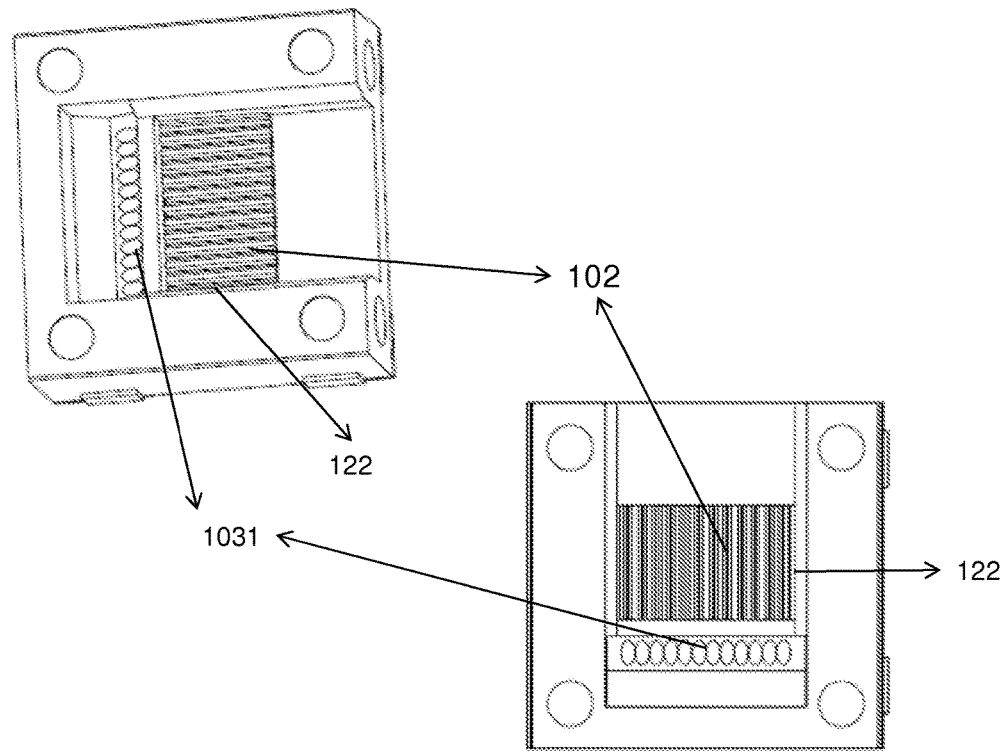
FIG. 4(a) shows a top perspective view and a top view of a lens block of the optical connector according to an embodiment of the present application.
Figure 4B:
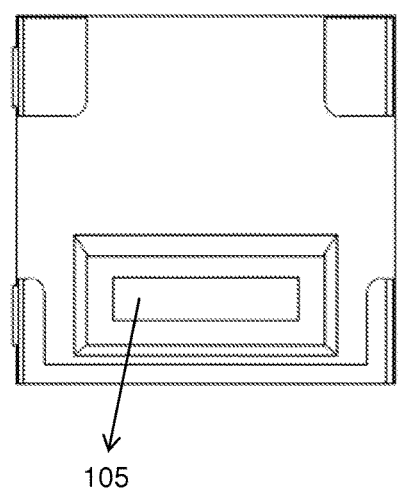
FIG. 4(b) shows a bottom view of the lens block of the optical connector according to an embodiment of the present application.

FIGS. 4(a)-4(c) shows different views of the lens block 0061 according to an embodiment of the present application. On the first surface 111, elliptical lens array 1031 may perform optical functions. On the second surface 104, the partial transmission coating 105 may be provided. On the transmitter side Tx, the elliptical lens array 1031 can collimate and totally reflect light to the second surface 104. On the receiver side Rx, the elliptical lens array 1031 can collect reflected light from the second surface 104, and focus the light onto the optical light guide 101.

A plurality of channels (e.g. 12 channels) 122 may be provided on the optical connector of the present application. Half of the channels may be provided on the transmitter side Tx and half of the channels may be provided on the receiver side Rx. The transmitter side Tx and the receiver side Rx may be provided on two quad small form factor pluggable (QSFP) boards respectively.

FIGS. 5(a)-5(d) show an assembly process of the optical connector according to an embodiment of the present application. As shown in FIG. 5(a), the monitor photo diode array 0066 can be bonded on the flexible PCB 0032. In FIG. 5(b), the flexible PCB 0032 with the monitor photo diode array 0066 can be assembled with monitor lens block 0061. As illustrated in FIG. 5(c), the optical light guide 101, the fiber cover 0063, and the cover locker 0064 are then assembled. As shown in FIG. 5(d), it is further assembled with the MPO housings 004, 005 and coupled with the external coupling light guide 109.

Figure 6B:
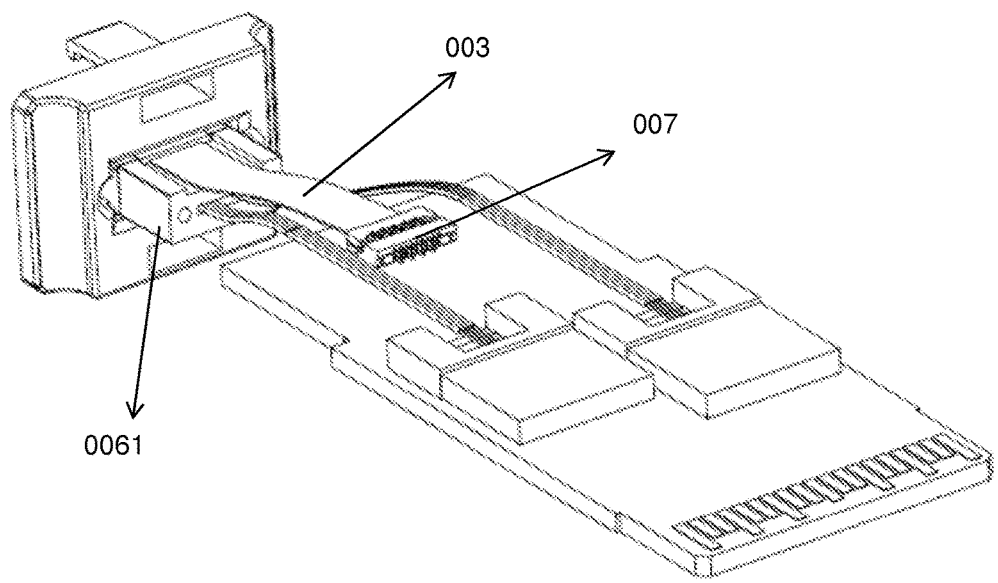
FIG. 6(b) is a rear perspective view of the optical connector according to another embodiment of the present application.

FIGS. 6(a) and 6(b) show an optical connector with transmitter and receiver assembled together according to a second embodiment of the present application. In this embodiment, the transmitting or transmitter side Tx and the receiving or receiver side Rx of the lens blocks 0061 can be provided side-by-side on the same piece of transceiver module. Hence, one block of the optical connector can perform on the transmitter side Tx and on the receiver side Rx at the same time.

In the embodiment, there are two optical light guides 101, namely a signal-transmitting optical light guide and a signal-receiving optical light guide. Each optical light guide 101 may have one end held in the internal MPO housing 005. The end of the signal-transmitting optical light guide may be held between the fiber cover 0063 and the lens block 0061 at the transmitter side thereof, and an opposite end of the signal-transmitting optical light guide may be connected with one optical engine assembly 002 provided on the data transceiver module 001. The end of the signal-receiving optical light guide may be held between the fiber cover 0063 and the lens block 0061 at the receiver side thereof, and an opposite end of the signal-receiving optical light guide may be connected with another optical engine assembly 002 provided on the data transceiver module 001.

FIG. 7 is a bottom view of the lens block 0061 of the optical connector with transmitter and receiver assembled together according to an embodiment of the present application. It can be seen that the partial transmission coating 105 may be provided at the transmitter side Tx of the lens block 0061, and the total reflective coating 106 may be provided at the receiver side Rx of the lens block 0061.

Figure 8A:
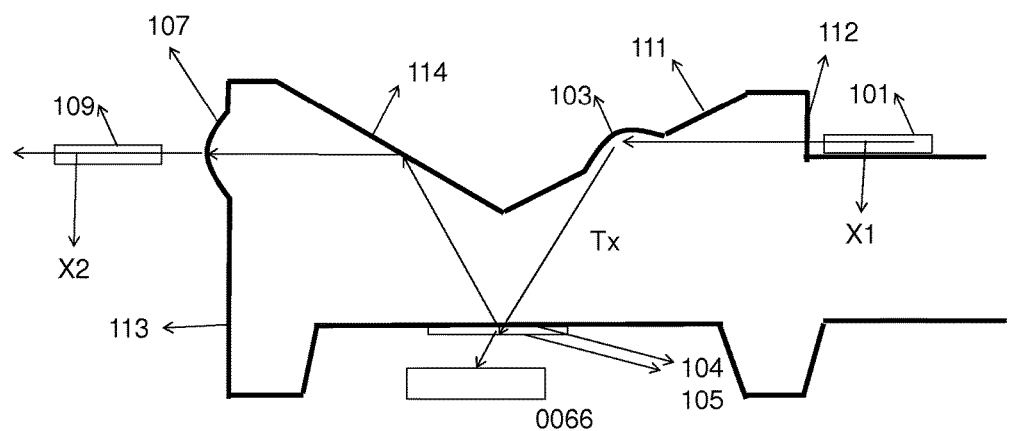
FIG. 8(a) shows an optical path at the transmitter side Tx of the monitor block of the optical connector according to another embodiment of the present application.
Figure 8B:
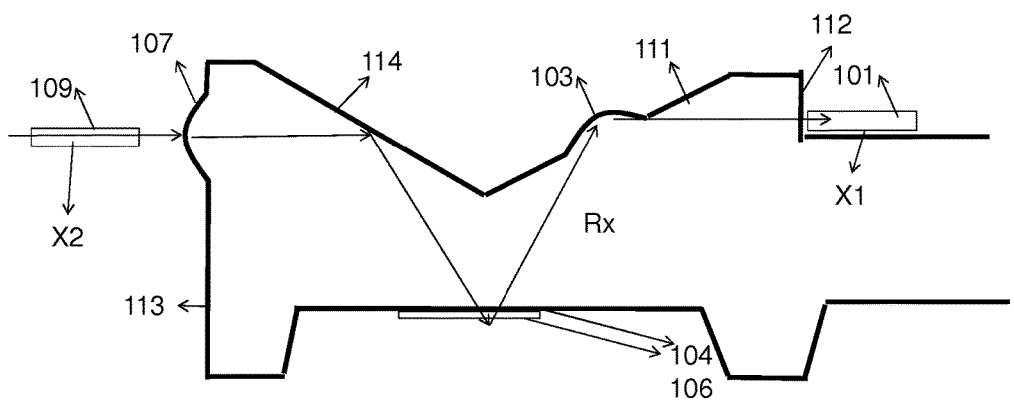
FIG. 8(b) shows an optical path at the receiver side Rx of the monitor block of the optical connector according to another embodiment of the present application.

FIG. 8(*a*) shows an optical path at the transmitter side Tx of the monitor lens block 0061 of the optical connector according to an embodiment of the present application. Basically, at the transmitter side Tx, light emitting out from the data transceiver module 001 goes through the optical light guide 101 (such as fiber, etc.), and is collected by the first lens 103. Light is collimated and totally reflected to the second surface 104. The second surface 104 may be coated with partial transmission coating 105 on the transmitter side Tx and total reflective coating 106 on the receiver side Rx. Particular percentage of power of light may be transmitted through the partial transmission coating 105 and monitored by the monitor photo diode array 0066. The other portion of light continues the path by reflection on the partial transmission coating 105. The light is reflected by the fourth surface 114 and reaches the second lens 107. Then the light is totally focused by the second lens 107 and finally coupled with the external coupling light guide 109.

FIG. 8(*b*) shows an optical path at the receiver side Rx of the monitor lens block 0061 of the optical connector. On the receiver side Rx, light emitting out from the external coupling light guide 109 is collected by the second lens 107. The light is collimated by the second lens 107 and totally reflected by the fourth surface 114 towards the second surface 104. The receiver side Rx 104 may be coated with total reflective coating 106. All of the light may continue the path by reflection on the total reflective coating 106, and reach the first lens portion 103. Then the light is totally reflected by the first lens 103 and focused onto the optical light guide 101 (such as fiber, etc.).

Figure 9A:
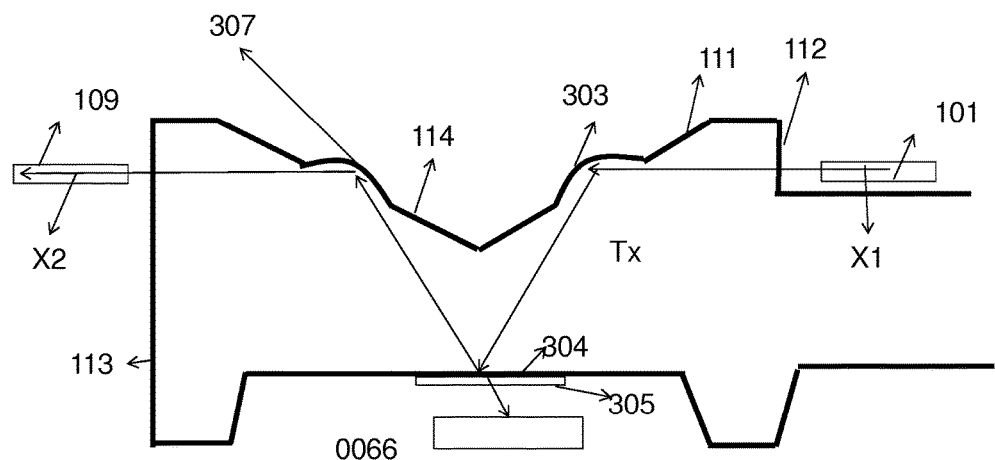
FIG. 9(a) shows an optical path at the transmitter side Tx of the monitor block of the optical connector according to a further embodiment of the present application.
Figure 9B:
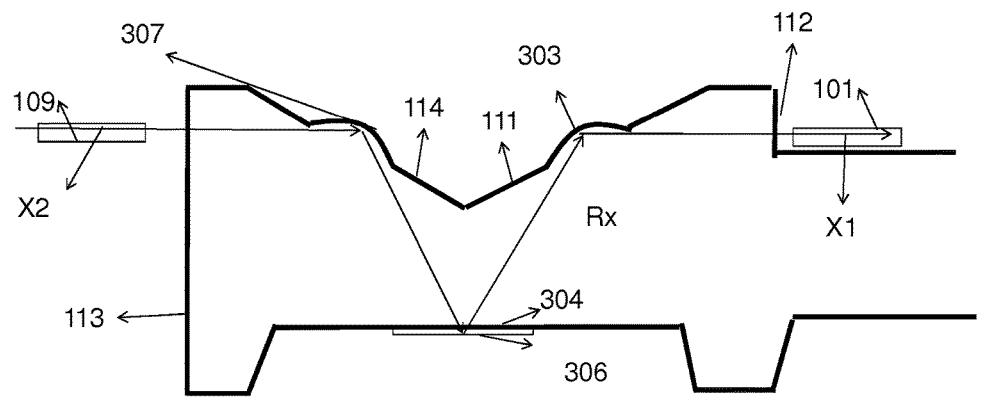
FIG. 9(b) shows an optical path at the receiver side Rx of the monitor block of the optical connector according to a further embodiment of the present application.

FIG. 9(*a*) shows an optical path at the transmitter side Tx of the monitor lens block 0061 of the optical connector according to a further embodiment of the present application. Basically, on the transmitter side Tx, light emitting out from the data transceiver module 001 passes through the optical light guide 101 (such as fiber, etc.), and is collected by a first lens 303. It is collimated and totally reflected to a second surface 304. The second surface 304 may be coated with a partial transmission coating 305 on the transmitter side Tx and a total reflective coating 306 on the receiver side Rx. Particular percentage of power of light can be transmitted through the partial transmission coating 305 and monitored by the monitor photo diode array 0066. The other portion of light may continue the path by reflection on the partial transmission coating 305, and reach a second lens 307. In this embodiment, the second lens 307 can be formed on the fourth surface 114 so that light from the second surface 304 can be totally reflected and focused by the second lens 307 onto the external coupling light guide 109 through the third surface 113.

FIG. 9(*b*) shows an optical path at the receiver side Rx of the monitor lens block 0061 of the optical connector. On the receiver side Rx, light emitting out from the external coupling light guide 109 passes through the third surface 113 and is collimated by the second lens 307 formed on the fourth surface 114. Then it is totally reflected by the second lens 307 towards the second surface 304. The receiver side Rx of the second surface 304 may be coated with total reflective coating 306. The light continues the path by being reflected on the total reflective coating 306, and reaches the first lens 303. Then the light is totally reflected by the first lens 303 and focused onto the optical light guide 101 (such as fiber, etc.).

Figure 10A:
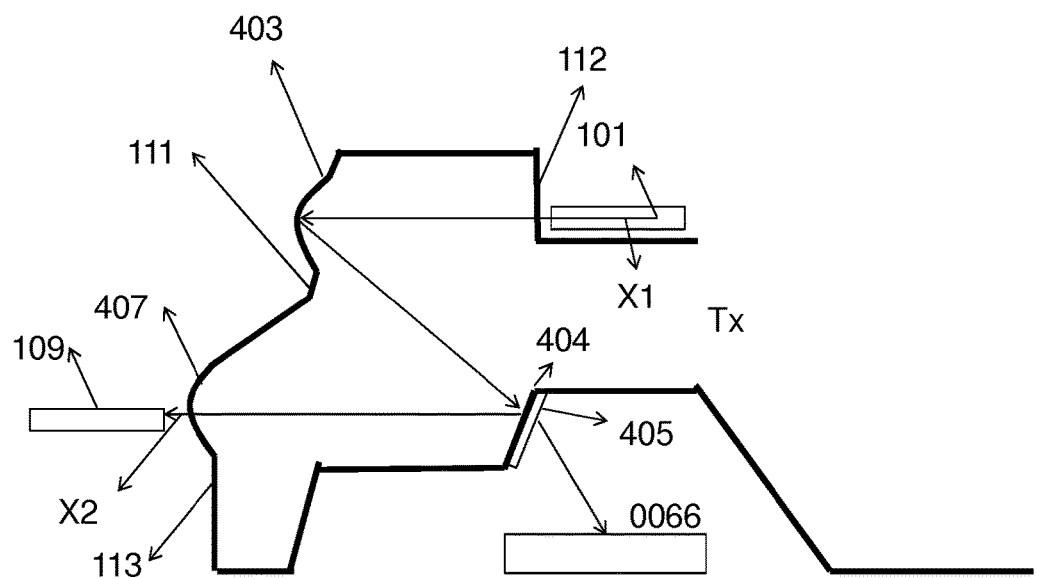
FIG. 10(a) shows an optical path at the transmitter side Tx of the monitor block of the optical connector according to yet another embodiment of the present application.
Figure 10B:
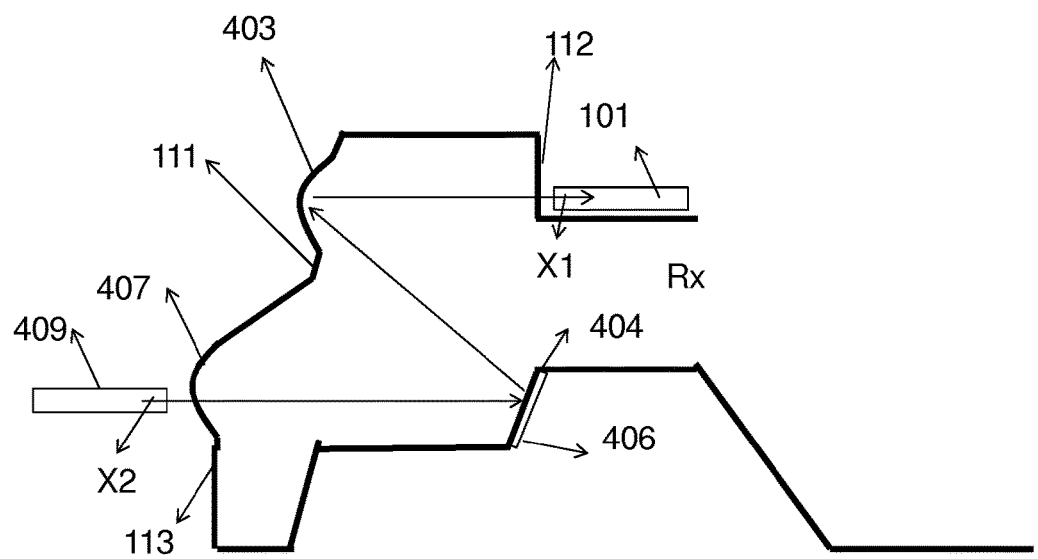
FIG. 10(b) shows an optical path at the receiver side Rx of the monitor block of the optical connector according to yet another embodiment of the present application.

FIG. 10(*a*) shows an optical path at the transmitter side Tx of the monitor lens block of the optical connector according to yet another embodiment of the present application. Basically, on the transmitter side Tx, light emitting out from the data transceiver module 001 passes through the optical light guide 101 (such as fiber, etc.), and is collected by a first lens 403. The first lens 403 is coated with a total reflective coating. Light is collimated and totally reflected to a second surface 404. The second surface 104 can be a flat surface disposed along and at an angle with respect to a second longitudinal axis X2 of the external coupling light guide 109. The second surface 404 may be coated with a partial transmission coating 405 on the transmitter side Tx and a total reflective coating 406 on the receiver side Rx. Particularly controlled partial power of light can be transmitted through the partial transmission coating 405 and monitored by monitor photo diode array 0066. The other portion of light continues the path by reflection on the second surface 404, and reaches a second lens 407 formed on a third surface 113. Then the light is totally focused onto the external coupling light guide 109.

FIG. 10(*b*) shows an optical path at the receiver side Rx of the monitor lens block 0061 of the optical connector. On the receiver side Rx, light emitting out from the external coupling light guide 109 transmits to the second lens 407 formed on the third surface 113. Light is collimated by the second lens 407 and transmits to the second surface 404. The receiver side Rx of the second surface 404 may be coated with total reflective coating 406. Light continues the path by being reflected on the second surface 404, and reaches the first lens 403. Then light is totally reflected by the first lens 403 and focused onto optical light guide 101 (such as fiber, etc.).

The optical connector of the present application can turn an entire monitoring system into an integrated monitoring block, and can make this block perfectly compatible with MPO connectors. The monitoring block is delicately constructed with precise size and perfect adapting features for light guides on both sides of the monitoring block.

MPD system can be put into common MPO housing and mate with the other side connector with a specifically designed air gap to avoid scratching the tip of the fiber. The monitoring block could be used as one type of optical connector for transmitter or receiver, and as part of a full transceiver while realizing power monitoring function at the same time. Of course, this power monitor is after the first stage OE lens coupling. It can reflect the change of VCSEL source in its functional time.

This optical connector can make application of MPD connector more flexible in use. It can connect the main signal processing PCB board with flexible PCB and can connect the VCSEL output coupling power with the optical light guide.

Data transmission module emits communication light from VCSEL. VCSEL light intensity change affects data transmission quality and stability. In order to have stable output power from VCSEL, power monitor is necessary for power monitoring functional VCSEL. The conventional method is to integrate a power monitor with VCSEL on the same substrate within a transmitter housing. The optical connector discloses in the present application uses fiber coupled light from transceiver for tapping a portion of light out with a partially transparent coating on a molded plastic lens block.

The power can be monitored by photo diode within the MPO housing, and the signal of the received light power from MPD can be transmitted to the main PCB in the module side with flexible PCB for further processing. On the other side, the transmission light coupled into jumper side fiber within MPO connector. Since the monitor lens block is included on one side of standard MPO housing, the fiber side coupling lens is facing the other side MPO connector. Then the two sides of the MPO housing can mate with each other using ordinary alignment features.

While the optical connector has been shown and described with particular references to a number of preferred embodiments thereof, it should be noted that various other changes or modifications may be made without departing from the scope of the appended claims.

What is claimed is:

1. An optical connector for data transceiver modules, the optical connector comprising:
   a standard internal multiple-fiber push-on/pull-off (MPO) housing;
   a lens block designed to be mounted inside the standard internal MPO housing, and optically coupled between an end of an optical light guide held in the standard internal MPO housing and an end of an external coupling light guide held in a standard external MPO housing, the lens block having a top surface facing upwards and a bottom surface facing downwards;
   a surface of the lens block being coated with a partial transmission coating, whereby a portion of light passing through the lens block is tapped out of the lens block through the partial transmission coating towards a monitor photo diode array;
   a fiber cover mounted on the top surface of the lens block, the end of the optical light guide being held between the fiber cover and the lens block, an opposite end of the optical light guide being connected with an optical engine assembly provided on a data transceiver module;
   an electrical substrate disposed underneath the bottom surface of the lens block, and the monitor photo diode array being mounted on the electrical substrate underneath the bottom surface of the lens block; and
   a flexible printed circuit board having one end connected with the electrical substrate and an opposite end connected with a printed circuit board connector provided on the data transceiver module;
   wherein the optical light guide, the lens block, the fiber cover, the monitor photo diode array, the electrical substrate, and the flexible printed circuit board form an optical piece inserted into the standard internal MPO housing.

2. The optical connector for data transceiver modules as claimed in claim 1, wherein the lens block comprises a first lens formed on a first surface and configured to collimate light from the optical light guide to a second surface, the entire second surface being coated with the partial transmission coating whereby a first portion of collimated light from the first lens is reflected to a second lens, and a second portion of collimated light from the first lens is tapped out of the lens block through the partial transmission coating towards the monitor photo diode array, and the second lens being configured to focus light from the second surface to the external coupling light guide.

3. The optical connector for data transceiver modules as claimed in claim 1, wherein the optical light guide is a 12-channel optical light guide.

4. An optical connector for data transceiver modules, the optical connector comprising:
   a standard internal multiple-fiber push-on/pull-off (MPO) housing;
   a standard external MPO housing configured to couple with the standard internal MPO housing;
   a signal-transmitting optical light guide and a signal-receiving optical light guide, each optical light guide having one end held in the standard internal MPO housing;
   an external coupling light guide having one end held in the standard external MPO housing;
   a lens block mounted in the standard internal MPO housing and optically coupled between the ends of the signal-transmitting and signal-receiving optical light guides and the end of the external coupling light guide, the lens block having a top surface facing upwards and a bottom surface facing downwards;
   a fiber cover mounted on the top surface of the lens block, the end of the signal-transmitting optical light guide being held between the fiber cover and the lens block at a transmitting side thereof and an opposite end of the signal-transmitting optical light guide being connected with a first optical engine assembly provided on a data transceiver module, the end of the signal-receiving optical light guide being held between the fiber cover and the lens block at a receiving side thereof and an opposite end of the signal-receiving optical light guide being connected with a second optical engine assembly provided on the data transceiver module;
   an electrical substrate disposed underneath the bottom surface of the lens block;
   a monitor photo diode array mounted on the electrical substrate underneath the bottom surface of the lens block; and
   a flexible printed circuit board having one end connected with the electrical substrate and an opposite end connected with a printed circuit board connector provided on the data transceiver module;
   wherein the signal-transmitting optical light guide comprises a first plurality of channels only for transmitting optical signals, and the signal-receiving optical light guide comprises a second plurality of channels only for receiving optical signals;
   wherein a surface of the lens block is coated with a partial transmission coating, whereby a portion of light passing through the lens block is tapped out of the lens block through the partial transmission coating towards the monitor photo diode array; and
   wherein the optical light guide, the lens block, the fiber cover, the monitor photo diode array, the electrical substrate, and the flexible printed circuit board form an optical piece inserted into the standard internal MPO housing.

5. The optical connector for data transceiver modules as claimed in claim 4, wherein the lens block comprises a first lens formed on a first surface and configured to collimate light from the signal-transmitting optical light guide to a second surface at a transmitting side of the lens block coated with the partial transmission coating, whereby a first portion of collimated light from the first lens is reflected to a second lens, and a second portion of collimated light from the first lens is tapped out of the lens block through the partial transmission coating towards the monitor photo diode array, and the second lens being configured to focus light from the second surface to the external coupling light guide, and wherein the second surface at a receiving side of the lens block is coated with a total reflective coating, whereby when light emitting from the external coupling light guide is collimated by the second lens, collimated light from the second lens is totally reflected by the total reflective coating towards the first lens and then focused onto the signal-receiving optical light guide.

6. The optical connector for data transceiver modules as claimed in claim 4, wherein the signal-transmitting optical light guide is a 6-channel optical light guide, and the signal-receiving optical light guide is a 6-channel optical light guide.

7. A lens block for an optical connector, the lens block comprising a first region configured to collimate light from a first optical light guide to a second region, the second region being coated with a partial transmission coating whereby a first portion of collimated light from the first region is reflected to a third region, and a second portion of collimated light from the first region is tapped out of the lens block through the partial transmission coating, and the third region being configured to focus light from the second region to a second optical light guide.

8. The lens block as claimed in claim 7, wherein the first region comprises an end surface facing the first optical light guide and a first lens formed on a first surface disposed at an angle with respect to the end surface, and the second region is provided with a second surface on which the partial transmission coating is coated.

9. The lens block as claimed in claim 8, wherein the third region comprises a second lens formed on a third surface facing the second optical light guide and a fourth surface disposed at an angle with respect to the third surface.

10. The lens block as claimed in claim 8, wherein the third region comprises a third surface facing the second optical light guide and a second lens formed on a fourth surface disposed at an angle with respect to the third surface.

11. The lens block as claimed in claim 8, wherein the third region comprises a second lens facing the second optical light guide, wherein the first lens is disposed along a first longitudinal axis of the first optical light guide, and the second surface is disposed along and at an angle with respect to a second longitudinal axis of the second optical light guide which is spaced apart from the first longitudinal axis of the first optical light guide, whereby optical light path in the lens block between the first and second optical light guides is Z-shaped.

12. The lens block as claimed in claim 9, wherein the entire lens block is only used for transmission and the second surface is entirely coated with the partial transmission coating, whereby when light emitting from the first optical light guide and entering the lens block through the end surface is totally reflected and collimated by the first lens, the first portion of collimated light from the first lens is reflected by the partial transmission coating towards the fourth surface where it is further reflected to the second lens and then focused onto the second optical light guide, and the second portion of collimated light from the first lens is tapped out of the lens block through the partial transmission coating.

13. The lens block as claimed in claim 9, wherein the lens block comprises a transmitting side and a receiving side, and the second surface at the transmitting side is coated with the partial transmission coating, whereby when light emitting from the first optical light guide and entering the transmitting side of the lens block through the end surface is totally reflected and collimated by the first lens, the first portion of collimated light from the first lens is reflected by the partial transmission coating towards the fourth surface where it is further reflected to the second lens and then focused onto the second optical light guide, and the second portion of collimated light from the first lens is tapped out of the lens block through the partial transmission coating.

14. The lens block as claimed in claim 13, wherein the second surface at the receiving side of the lens block is coated with a total reflective coating, whereby when light emitting from the second optical light guide is collimated by the second lens, the collimated light from the second lens is totally reflected by the fourth surface and further totally reflected by the total reflective coating towards the first lens and then focused onto a third optical light guide.

15. The lens block as claimed in claim 10, wherein the lens block comprises a transmitting side and a receiving side, and the second surface at the transmitting side of the lens block is coated with the partial transmission coating, whereby when light emitting from the first optical light guide and entering the transmitting side of the lens block through the end surface is totally reflected and collimated by the first lens, the first portion of collimated light from the first lens is reflected by the partial transmission coating towards the second lens where it is focused onto the second optical light guide through the third surface, and the second portion of collimated light from the first lens is tapped out of the lens block through the partial transmission coating.

16. The lens block as claimed in claim 15, wherein the second surface at the receiving side of the lens block is coated with a total reflective coating, whereby when light emitting from the second optical light guide and entering the lens block through the third surface is collimated by the second lens, the collimated light from the second lens is totally reflected by the total reflective coating towards the first lens and then focused onto a third optical light guide.

17. The lens block as claimed in claim 15, wherein the lens block comprises a transmitting side and a receiving side, and the second surface at the transmitting side of the lens block is coated with the partial transmission coating, whereby when light emitting from the first optical light guide and entering the lens block through the end surface is totally reflected and collimated by the first lens, the first portion of collimated light from the first lens is reflected by the partial transmission coating towards the second lens and then focused onto the second optical light guide, and the second portion of collimated light from the first lens is tapped out of the lens block through the partial transmission coating.

18. The lens block as claimed in claim 17, wherein the second surface at the receiving side of the lens block is coated with a total reflective coating, whereby when light emitting from the second optical light guide is collimated by the second lens, the collimated light from the second lens is totally reflected by the total reflective coating towards the first lens and then focused onto a third optical light guide.

19. The lens block as claimed in claim 8, wherein the first surface is an angled surface disposed along and at an angle with respect to a first longitudinal axis of the first optical light guide.

20. The lens block as claimed in claim 9, wherein the third surface is an angled surface disposed along and at an angle with respect to a second longitudinal axis of the second optical light guide.

* * * * *